US006806916B1

(12) United States Patent
Sakaguchi et al.

(10) Patent No.: US 6,806,916 B1
(45) Date of Patent: Oct. 19, 2004

(54) VIDEO APPARATUS WITH IMAGE MEMORY FUNCTION

(75) Inventors: Takashi Sakaguchi, Yamatotakada (JP); Takeshi Hamasaki, Yao (JP); Masaaki Nakayama, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/133,677

(22) Filed: Aug. 13, 1998

Related U.S. Application Data

(62) Division of application No. 08/634,769, filed on Apr. 19, 1996, now Pat. No. 5,940,146.

(30) Foreign Application Priority Data

Apr. 28, 1995 (JP) ............................................. 07-105560

(51) Int. Cl.[7] ............................................... H04N 5/44
(52) U.S. Cl. ...................................... 348/718; 348/561
(58) Field of Search ..................... 375/240.26; 348/714, 348/718, 561; H04N 5/44

(56) References Cited

U.S. PATENT DOCUMENTS

| | | | |
|---|---|---|---|
| 4,240,101 A | 12/1980 | Michael et al. | |
| 4,468,693 A | 8/1984 | Fujita et al. | |
| 4,864,402 A | 9/1989 | Ebihara et al. | |
| 5,315,388 A | 5/1994 | Shen et al. | |
| 5,345,264 A | 9/1994 | Murata et al. | |
| 5,355,178 A | 10/1994 | Parulski | |
| 5,418,907 A | 5/1995 | Ohki | |
| 5,519,452 A | 5/1996 | Parulski | |
| 5,777,691 A | * 7/1998 | Kubo et al. ................. | 348/718 |

FOREIGN PATENT DOCUMENTS

| | | |
|---|---|---|
| EP | A0249985 | 12/1987 |
| EP | A0543197 | 5/1993 |
| GB | A2260008 | 3/1993 |
| JP | 6-81276 B2 | 4/1990 |
| JP | 7-73342 B2 | 2/1994 |

OTHER PUBLICATIONS

Yukiko Nakajima, et al.; "A New Noise Reduction System for Video Camera"; Aug. 1991; IEEE Transactions on Consumer Electronics, vol. 37, No. 3, pp. 213–219.
Patent Abstracts of Japan, vol. 018, No. 549 (E–1618), Oct. 19, 1994, and JP–A–06 197274 (Canon Inc.), Jul. 15, 1994 *abstract*.
"Electronic Image Stabilization System For Video Cameras and VCRs," Uomori, et al., *SMPTE Journal*, vol. 101, No. 2, pp. 66–75, Feb. 1992 White Plains, NY, USA.

* cited by examiner

*Primary Examiner*—Young Lee
(74) *Attorney, Agent, or Firm*—Stevens, Davis, Miller & Mosher, LLP

(57) ABSTRACT

A video apparatus with image memory function has a memory of three ports (one for write, two for read), memory read control units corresponding to two independent read ports and adapted to read a desired area (first area) from a first read port and an area (second area) which contains the first area and is wider than the first area from a second read port, and a memory write control unit. With this construction, an input video signal is written to the memory, starting with a write head address designated by the memory write control unit, the first and second fields to be read during the next field are determined during the period of vertical blanking, a next write head address is determined to be after the first area, and a signal of the first area is delivered as an output video signal.

9 Claims, 11 Drawing Sheets

VIDEO APPARATUS WITH IMAGE MEMORY FUNCTION

This application is a division of Ser. No. 08/634,769 filed Apr. 19, 1996, U.S. Pat. No. 5,940,146.

BACKGROUND OF THE INVENTION

1. Field of the Invention

The present invention relates to the memory function in a video processing apparatus such as a video camera and more particularly to a video apparatus with image memory function capable of realizing a plurality of functions using a memory such as the electronic enlarging processing and the recursive type noise reduction processing.

2. Description of the Related Art

A video apparatus (1) having the electronic enlarging function using a field memory, (2) having the recursive type noise reduction function using a field memory or (3) having the electronic enlarging function, the recursive type noise reduction function and a function selecting circuit to realize either one of the above functions by using a field memory has hitherto been developed as the video apparatus with image memory function.

As a typical example, the video apparatus having the electronic enlarging function using a field memory will first be described. (Japanese Patent Application No. 63-263207 (JP-A-2-109474), "Image Memory Apparatus").

The video apparatus has a field memory having a capacity of storing an image of one field or more, a memory read control unit for reading a desired area of a signal of a first field stored in the field memory, and a memory write control unit for determining a write head address of a second field following the first field to be an address after an address next to a read end address of the area read by the memory read control unit.

With this construction, an input video signal is written to the field memory, starting with the write head address assigned by the memory write control unit, head and end addresses of a desired area to be read during a trailing field are determined, and the write head address is determined after an address next to the read end address. Through this, a video signal of the area to be read does not overlap a video signal to be newly written during the trailing field and the image enlarging processing can be realized with the memory of one field.

The video apparatus of the above construction, however, requires the field memory dedicated to realization of the electronic enlarging function and by using this field memory, it cannot afford to simultaneously realize the electronic enlarging function and the digital function using another field memory, for example, the recursive noise reduction function.

Next, the video apparatus having the recursive type noise reduction function using a field memory will be described. ("A New Noise Reduction System for Video Camera" by Nakajima et al, IEEE Transactions on Consumer Electronics, Vol. 37, No. 3, August, 1991).

In the video apparatus, first subtraction means determines a difference signal between an input video signal and an output signal of a field memory. At that time, if the input video signal is a still image, then the video signal will hardly be contained in the difference signal and only a noise will be taken out. Second subtraction means subtracts this difference signal from the input signal, thereby reducing the noise.

With this recursive type noise reduction apparatus, however, the video signal is largely contained in the difference signal in the case of a moving picture. Consequently image degradation occurs, when the difference signal is subtracted from the input signal. Accordingly, on the statistical ground that the noise is generally smaller in amplitude than the signal, the difference signal is multiplied by a coefficient k, where $0 \leq k \leq 1$, by means of multiplier means and only a part of small amplitude is extracted as a noise. More specifically, for a part of the difference signal which is small in amplitude, the noise is extracted by controlling k to a value approximating 1 but for a part of the difference signal which is large in amplitude, the noise is extracted by controlling k to a value approximating 0. By subtracting the thus extracted noise from the input signal, the noise can be reduced while suppressing afterimage. By performing the control by the multiplier means based on the amplitude value in accordance with individual frequency bands of the input video signal, the noise reduction can be realized while further suppressing the afterimage.

The above construction, however, requires the field memory dedicated to realization of the recursive type noise reduction function and by using this field memory, it cannot afford to simultaneously realize the recursive type noise reduction function and the digital function using another field memory, for example, the electronic enlarging function.

Finally, the video apparatus having the electronic enlarging function, the recursive type noise reduction function and a function selecting circuit to realize either one of the above functions by using a field memory will be described. (Japanese Patent Application No. H4-44690 (JP-A-6-46317) entitled "Video Signal Processing Circuit" and U.S. Pat. No. 5,345,264 entitled "Video Signal Processing Circuit for a Video Camera Using a Luminance Signal").

In a video signal processing circuit having a memory for storing at least one field of an output resulting from AD conversion of a CCD output, a memory control circuit for controlling the read position of the memory in accordance with a designated zoom magnification, and an interpolation circuit for interpolating the output of the memory with an interpolation coefficient in accordance with the zoom magnification, the memory is also used as a memory constituting a recursive type noise reducer. Also, in a video signal processing circuit having a memory for storing at least one field of an output resulting from AD conversion of a CCD output, a moving vector detecting circuit for detecting a moving vector from the AD converted output, a memory control circuit for controlling the position of reading of the memory in accordance with a moving vector specified on the basis of the output of the moving vector detecting circuit or a designated zoom magnification, and an interpolation circuit for interpolating the output of the memory with an interpolation coefficient complying with a zoom magnification, the memory is also used as a memory constituting a recursive type noise reducer.

In the above construction, however, realization of the recursive noise reduction function and the electronic type enlarging function is switched using the provided field memory and both the functions cannot be realized simultaneously.

SUMMARY OF THE INVENTION

A principal object of the present invention is to provide a video apparatus with image memory function which can simultaneously realize a plurality of functions such as the electronic enlarging function and the recursive type noise reduction function by using a memory of one field.

To accomplish the above object, a video apparatus with image memory function according to the present invention comprises a field memory having at least two independent read ports and a capacity of storing an image of one field or more, at least two memory read control units corresponding to the two independent read ports, and a memory write control unit.

In the present invention, a first read control unit standing for one of the at least two read control units reads a first area standing for a desired area of a signal of an n-th field stored in the field memory, a second read control unit standing for the other of the at least two read control units reads a second area standing for an area which contains the first area of the signal of the n-th field stored in the field memory and is wider than the first area, a write head address of an (n+1)-th field following the n-th field is so determined as to be after an address next to a read end address of the first area, a video signal of the (n+1)-th field is written to the field memory, starting with the write head address, and the signal of the first area is delivered as a video signal.

DESCRIPTION OF THE PREFERRED EMBODIMENTS

The present invention will now be described by way of example with reference to the accompanying drawings.

Figure 1:
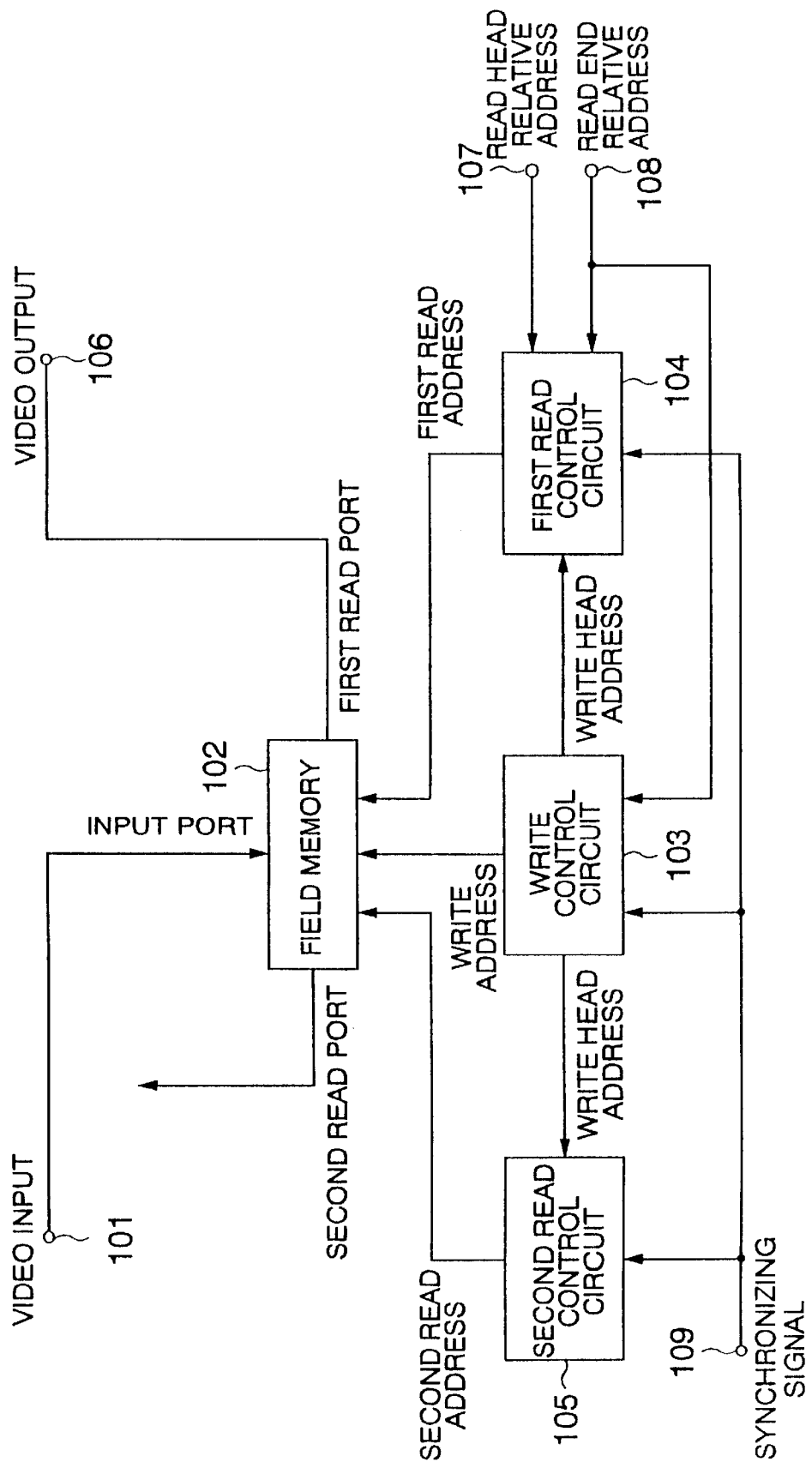
FIG. 1 is a block diagram of a video apparatus with image memory function according to a first embodiment of the present invention.

FIG. 1 is a block diagram showing a video apparatus with image memory function according to a first embodiment of the present invention.

Referring to FIG. 1, a video input signal is received by an input terminal 101 and fed to a field memory 102 of three-port type. A write control circuit 103 controls write to the field memory 102, a first read control circuit 104 controls read from a first read port of the field memory 102, and a second read control circuit 105 controls read from a second read port of the field memory 102. Denoted by 106 is an output terminal of a video output signal, by 107 and 108 are input terminals for receiving a read head relative address and a read end relative address, respectively, which are supplied from a separate circuit, for example, a microcomputer, and by 109 is an input terminal for receiving a synchronizing signal of the video signal.

The operation of the video apparatus with image memory function constructed as above will be described below with reference to FIGS. 2 and 3.

Figure 2:
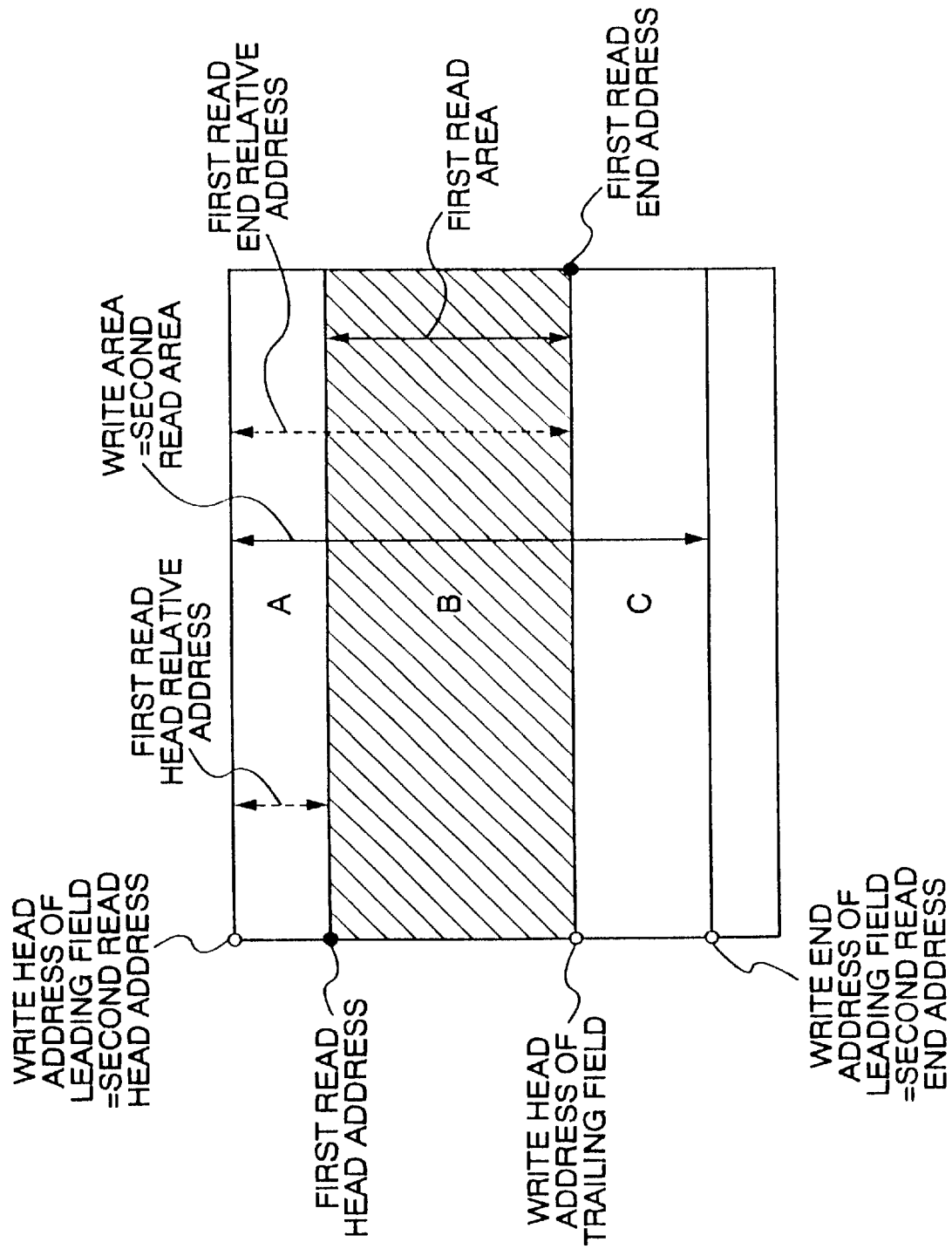
FIG. 2 is a diagram for explaining field memory control in the video apparatus with image memory function of the first embodiment of the present invention.

FIG. 2 is a diagram showing the relation between one field of a video signal written to the field memory 102 and areas to be read from the field memory 102 (first and second read areas). In the figure, a write area which coincides with the second read area is designated by A, B and C and the first read area (hatched portion) is designated by B. A write head address of a leading field equals a second read head address of a present field and the write area coincides with the second read area. On the other hand, a first read head address is at a left-above corner of the first read area and this address is determined by adding the first read head relative address to the write head address of the leading field which is obtained from the write control circuit 103. Similarly, a first read end address at a right-below corner of the hatched portion B is determined by adding the first read end relative address to the write head address of the leading field. The additive processing is carried out by the first read control circuit 104. The present field is read during a trailing field and a write head address of the trailing field which is written simultaneously with read of the leading field is determined by the write control circuit 103 so as not to overlap the first read area and so as to approximate the first read end address (see also FIG. 3). If the field memory 102 has a capacity of only one field, then the write head address of this field will be set to an address within the range between an address next to a read end address and a head address of a scanning line following a scanning line on which read operation ends or within the range added with a margin when the capacity of the field memory 102 has the margin (see also FIG. 3). Thus, the write control circuit 103 generates, from the synchronizing signal and the read end relative address, a write address corresponding to a video input signal 101 and the write address is fed to the field memory 102. A write head address of the present field is applied to the first and second read control circuits 104 and 105. The first read control circuit 104 generates, from the write head address, a read end relative address and a synchronizing signal, a first read address corresponding to data of the first read area shown in FIG. 2, the second read control circuit 105 responsive to the write head address and synchronizing signal generates a second read address corresponding to data of the second read area, and the first and second read addresses are fed to the field memory 102.

Figure 3:
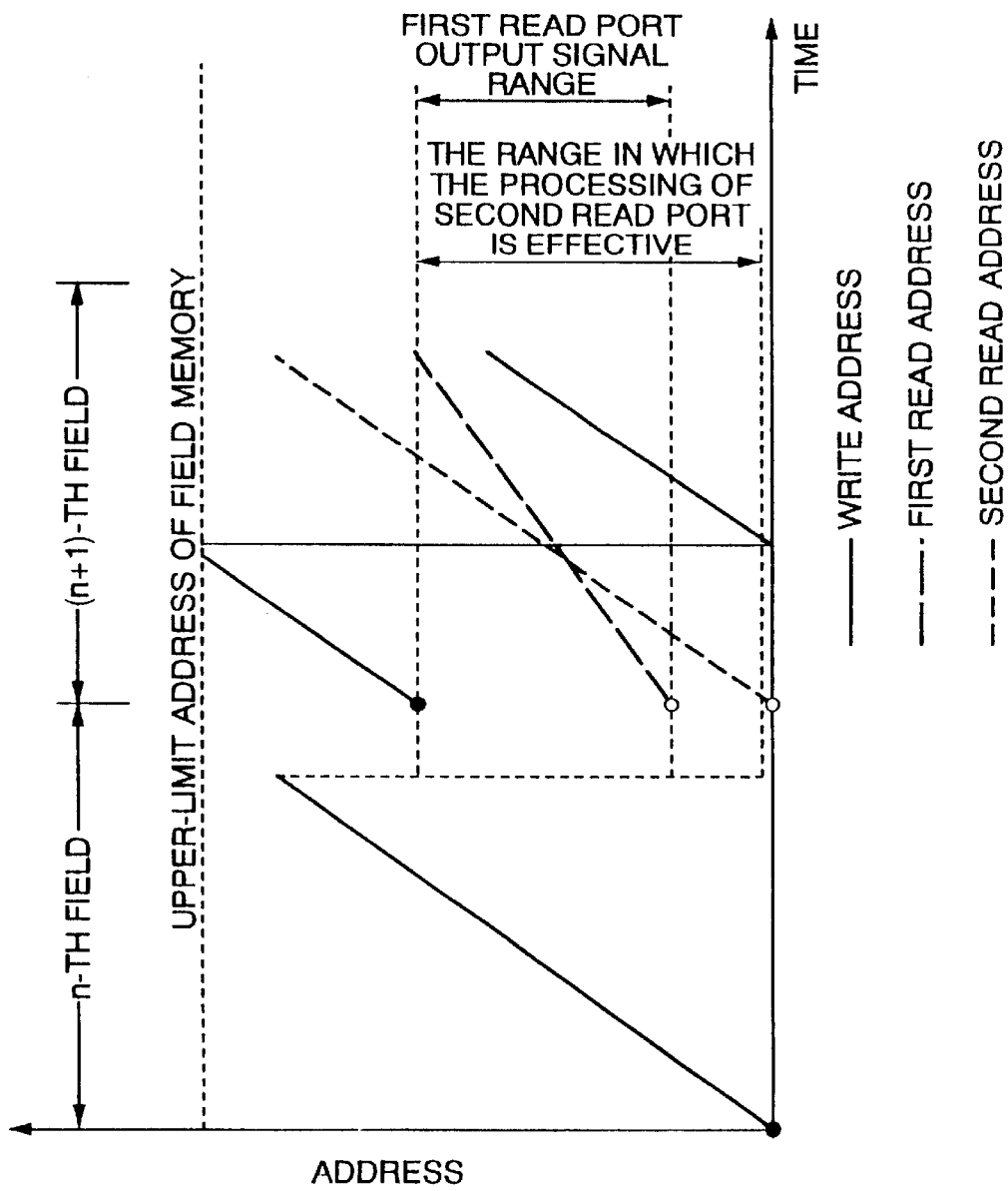
FIG. 3 is a diagram for explaining address control of the field memory in the video apparatus with image memory function of the first embodiment of the present invention.

FIG. 3 is a diagram which shows generation timings of the write and read addresses generated as described above, depicting the state in which while a signal written during an n-th field is read during an (n+1)-th field, a new write operation is carried out. The write head address in each field is indicated by a black circle and the read head address is indicated by a white circle. While taking control of, for example, the enlargement magnification of electronic enlarging function and the position of an area within one frame to be cut out for image stabilizing correction, a first read head address during the (n+1)-th field is determined by adding a read head relative address to a write head address of the n-th field as described above and a write head address (black circle) of the (n+1)-th field is determined from a read end address which is determined by adding a read end relative address to the write head address of the n-th field. Through control of, for example, the recursive type noise reduction function, the write head address of the n-th field is used as a second read head address during the (n+1)-th field as described above.

In FIG. 3, the write address (solid line) is terminated in its change prior to the termination of the time period of the n-th field. This indicates that the writing is terminated during a time period (blanking period) that exceeds a time period of the video output at the termination of the n-th field. A value of the write address and the read address of the (n+1)-th field is determined during this time period (blanking period). FIG. 3. shows the upper limit of the address of the field memory in which the address returns to a start position (lower limit) of the address when the address reaches the upper limit. Thus, the address is variable in a ring form so that the upper limit of the address is connected to the start position (lower limit) of the address. The write address is determined from the address which is variable in the ring form.

The write (read) address is so controlled that when reaching an upper-limit address of the field memory, the write (read) address is continued to a lower-limit address of the field memory to proceed with write (read) operation.

At that time, as shown in FIG. 3, a signal of the first read area read out in accordance with the first read address during the (n+1)-th field is not outrun by the write address, but a signal of the second read area read out in accordance with the second read address is rewritten to new data on the way by the write operation to the (n+1)-th field and as a result, the range in which the processing using the second read area signal is effective is limited. In other words, the range in which the processing of, for example, recursive type noise reduction standing for the processing using the second read area signal is effective is limited, and there occurs a range in which noise reduction is not effected. The write operation brings about rewrite to new data on the way when, for example, the electronic enlarging function is realized by performing interpolation using the first read area signal and in the case where the first read area signal is used as a final output. However, it suffices that the first read area signal is reduced in noise and as shown in FIGS. 2 and 3, the first read area signal is totally included in the range in which the recursive type noise reduction is effective.

By repeating the above operation, the video input signal is written to the field memory 102 and at the same time, the area designated by the read head relative address and read end relative address is read out of the first read port of the field memory 102 so as to be delivered as a final output signal. The signal of the area read out of the first read port is a signal which is removed of noise by the recursive type noise reduction function using the signal from the second read port.

As described above, in the video apparatus with image memory function of the present embodiment, the function which otherwise uses a plurality of memories, such as the recursive type noise reduction function, the electronic enlarging function or the image stabilizing correction, can be realized with one field memory having three ports.

Figure 4:
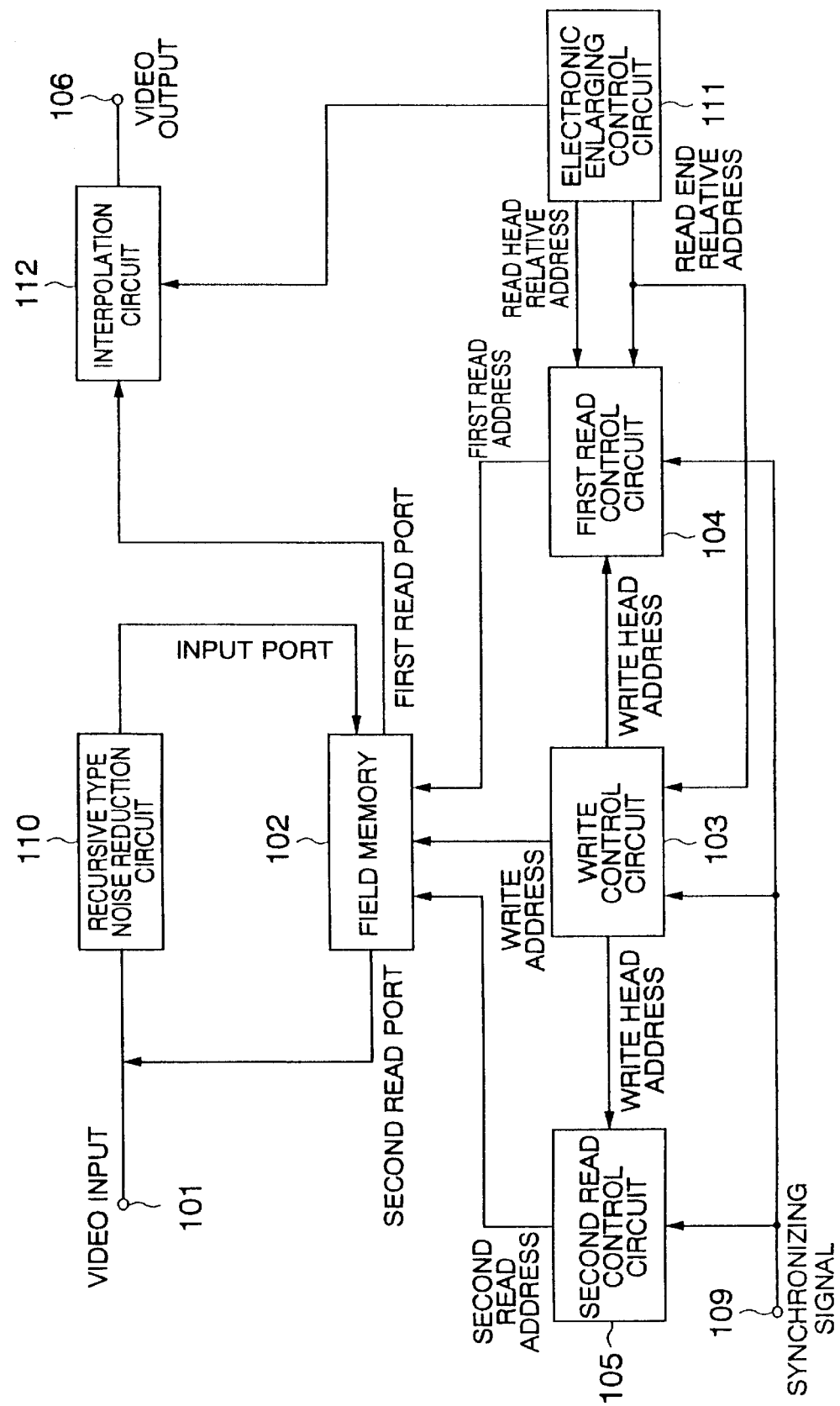
FIG. 4 is a block diagram of a video apparatus with image memory function according to a second embodiment of the present invention.

FIG. 4 is a block diagram showing a video apparatus with image memory function according to a second embodiment of the present invention.

In FIG. 4, components common to FIG. 1 are designated by like reference numerals and components different from those of FIG. 1 will be described below. Referring to FIG. 4, a video signal 101 is inputted to a recursive type noise reduction circuit 110. An electronic enlarging control circuit 111 controls the electronic enlarging function (electron zoom) and generates a read head relative address, a read end relative address and an interpolation control signal as necessary and an interpolation circuit 112 applies interpolation to a partial area of an image delivered out of the first read port of the field memory 102 so as to enlarge the partial area to a picture of one frame.

The operation of the video apparatus with image memory function constructed as above will now be described with reference to FIGS. 5 and 6.

Figure 5:
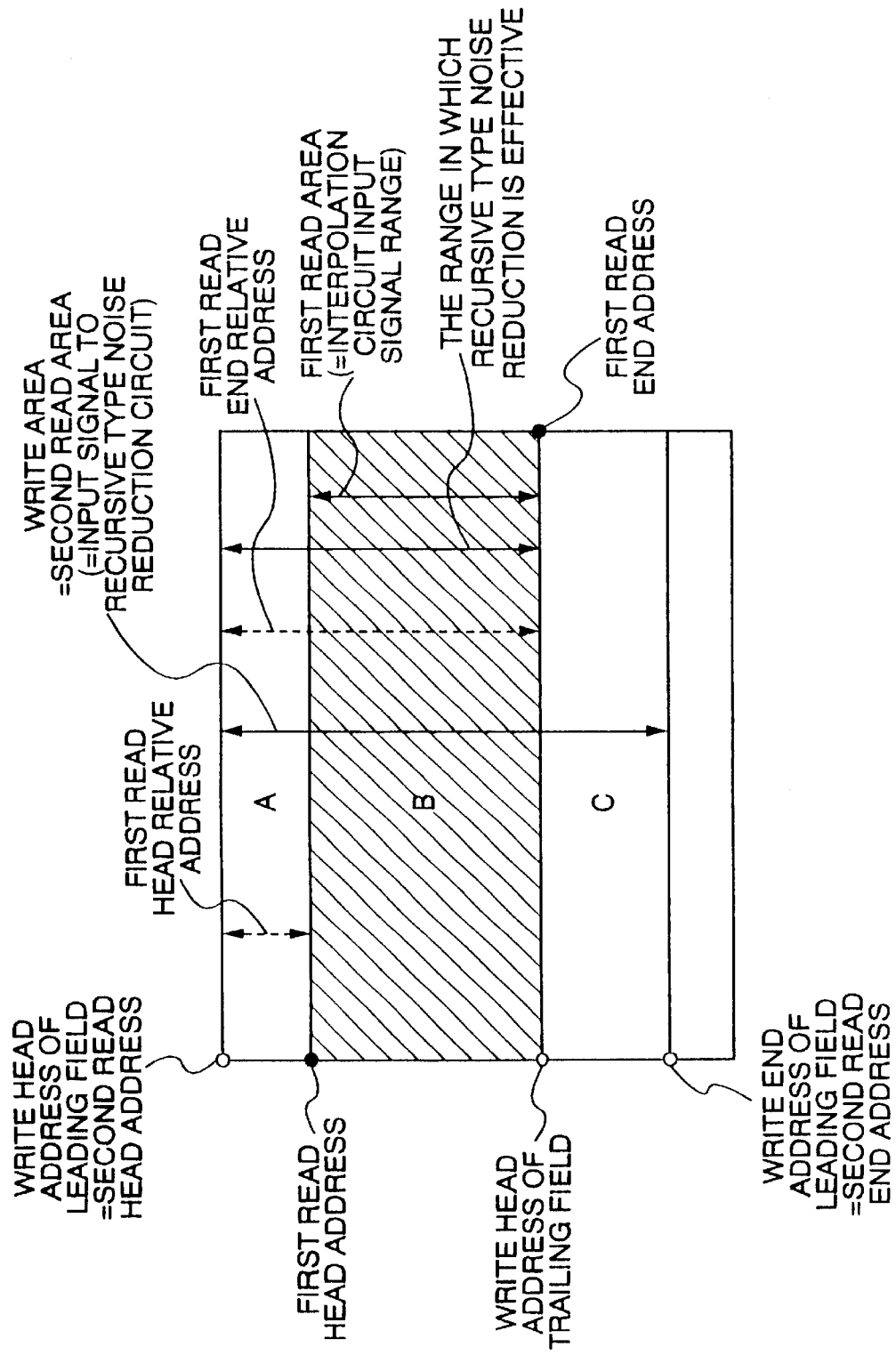
FIG. 5 is a diagram for explaining field memory control in the video apparatus with image memory function of the second embodiment of the present invention.

Like FIG. 2, FIG. 5 is a diagram showing the relation between one field of a video signal written to the field memory 102 and areas to be read from the field memory 102 (first and second read areas). In the figure, a write area which coincides with the second read area is designated by A, B and C and the first read area (hatched portion) his designated by B. A write head address of a leading field equals a second read head address of this field and the write area coincides with the second read area. On the other hand, a first read head address is at a left-above corner of the first read area and this address is determined by adding the read head relative address supplied from the electronic enlarging control circuit 111 to the write head address of the leading field which is obtained from the write control circuit 103. Similarly, a first read end address at a right-below corner of the hatched portion B is determined by adding the read end relative address supplied from the electronic enlarging control circuit 111 to the write head address of the leading field. The additive processing is carried out by the first read control circuit 104. The present field is read during a trailing field and a write head address of the trailing field which is written simultaneously with read of the leading field is determined by the write control circuit 103 so as not to overlap the first read area and so as to approximate the first read end address (see also FIG. 6). If the field memory 102 has a capacity of only one field, then the write head address of this field will be set to an address within the range between an address next to a read end address and a head address of a scanning line following a scanning line on which read operation ends or within the range added with a margin when the capacity of the field memory 102 has the margin (see also FIG. 6). Thus, the write control circuit 103 generates, from the synchronizing signal and the read end relative address supplied from the electronic enlarging control circuit 111, a write address corresponding to a video input signal and the write address is fed to the field memory 102. A write head address of the present field is applied to the first and second read control circuits 104 and 105. The first read control circuit 104 generates, from the write head address and a read end relative address supplied from the electronic enlarging control circuit 111 as well as the synchronizing signal 109, a first read address corresponding to data of the first read area shown in FIG. 5, the second read control circuit 105 generates a second read address corresponding to data of the second read area, and the first and second read addresses are fed to the field memory 102.

Figure 6:
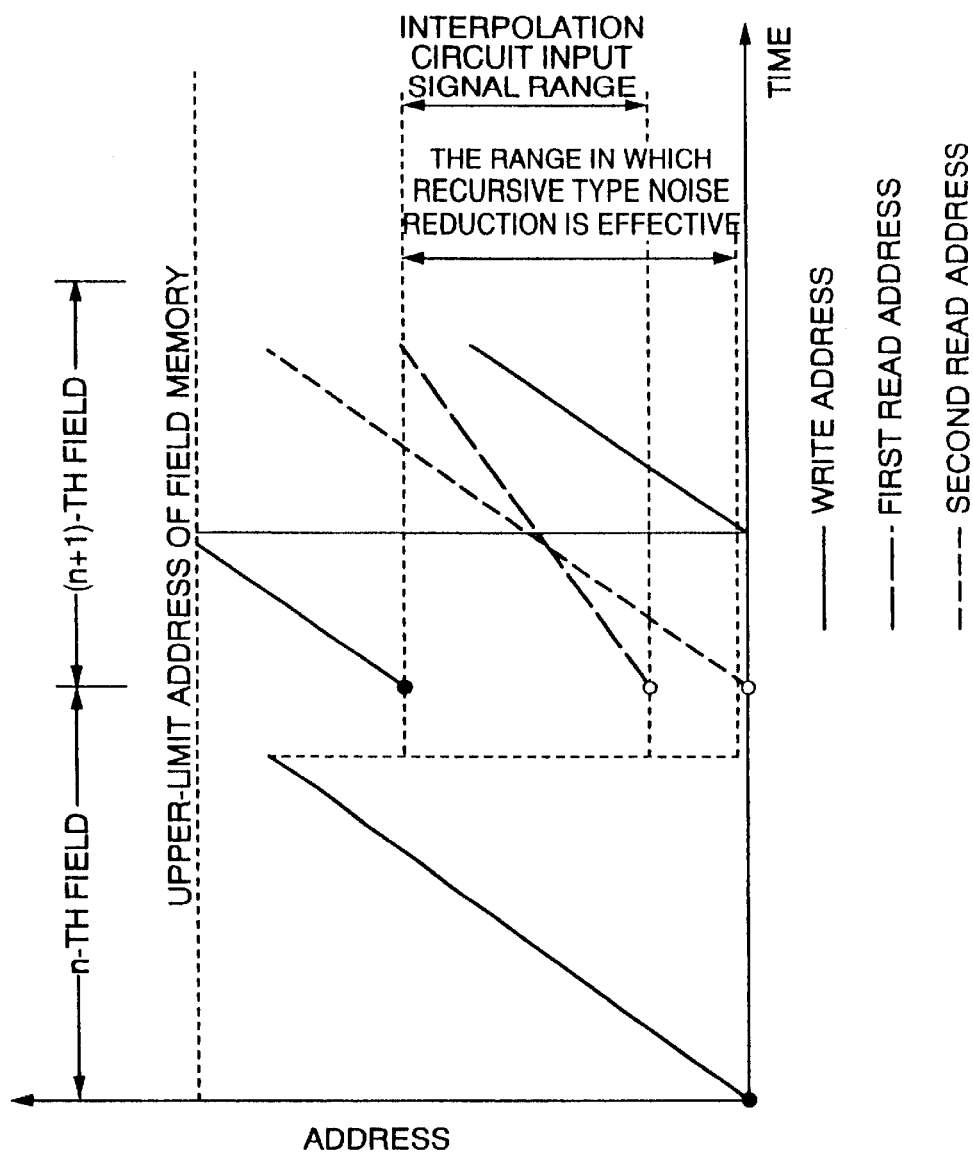
FIG. 6 is a diagram for explaining address control of the field memory in the video apparatus with image memory function of the second embodiment of the present invention.

FIG. 6 is a diagram which shows generation timings of the write and read addresses generated as above, depicting the state in which while a signal written during an n-th field is read during an (n+1)-th field, a new write operation is carried out. The write head address in each field is indicated by a black circle and the read head address is indicated by a white circle. While taking control of, for example, the zoom magnification in the electronic enlarging control circuit 111 and the position of an area within one frame to be cut out, a first read head address during the (n+1)-th field is determined by adding a read head relative address to a write head address of the n-th field as described above and a write head address (black circle) of the (n+1)-th field is determined from a read end address which is determined by adding a read end relative address to the write read address of the n-th field. Since the recursive type noise reduction circuit 110 performs the recursive type noise reduction, the write head address of the n-th field is used as a second read head address during the (n+1)-th field as described above.

The write (read) address is so controlled that when reaching an upper-limit address of the field memory, the write (read) address is continued to a lower-limit address of the field memory to proceed with write (read) operation.

When the vertical position of the first read area is different for each field, for example, when the enlargement magnification of the electronic enlarging function is different or when the position of an area within one frame to be cut out is changed for the purpose of performing image stabilizing correction by using the electronic enlarging function, the write head address must be settled before write of the present field is started. In other words, calculation for this purpose must be completed before the effective period of the present field starts.

Figure 7:
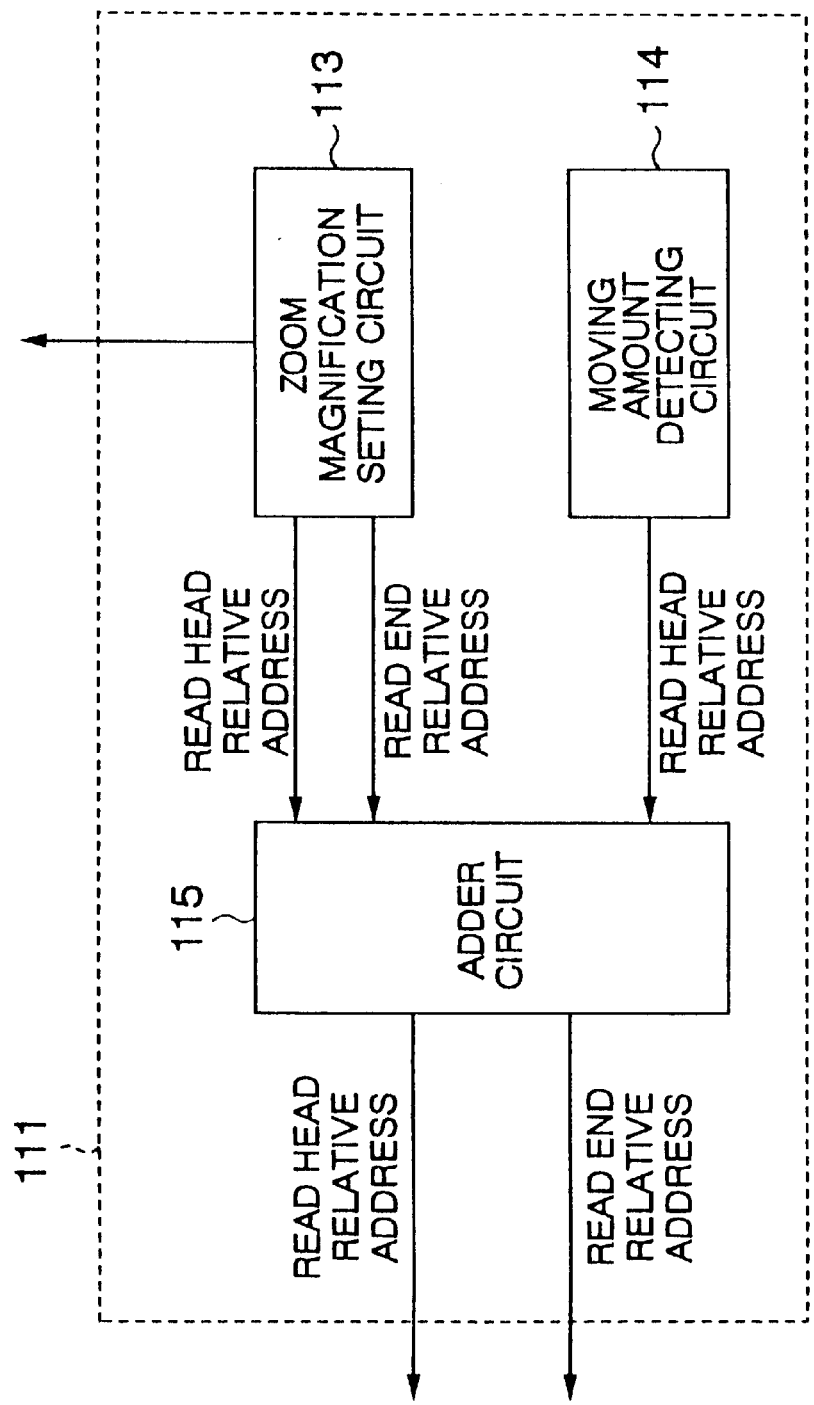
FIG. 7 is a block diagram of an electronic enlarging control circuit in the video apparatus with image memory function of the second embodiment of the present invention.

An example of construction of the electronic enlarging control circuit 111 in image stabilizing correction using the electronic enlarging function will now be described briefly with reference to FIG. 7. The electronic enlarging control circuit 111 includes a zoom magnification setting circuit 113, a moving amount detecting circuit 114 and an adder circuit 115. The zoom magnification setting circuit 113 generates a read head relative address and a read end relative address necessary for cutting out a central portion of a frame which is written to the field memory 102 in accordance with an electron zoom magnification. The moving amount detecting circuit 114, on the other hand, generates a read head relative address necessary for canceling movement such as image stabilizing in accordance with a detected moving amount. Then, the adder circuit 115 adds the read head relative address generated by the moving amount detecting circuit 114 to the read head relative address and read end relative address both generated by the zoom magnification setting circuit 113. In other words, the read head relative address generated by the electronic enlarging control circuit 111 is determined in accordance with the electron zoom magnification, and moving amount and the read end relative address is determined in accordance with the electron zoom magnification.

At that time, as shown in FIG. 6, a signal of the first read area read out in accordance with the first read address during the (n+1)-th field is not outrun by the write address, but a signal of the second read area read out in accordance with the second read address is rewritten to new data on the way by the write operation to the (n+1)-th field. As a result, the effective range of noise reduction performed by using the second read area signal by means of the recursive type noise reduction circuit 110 is limited, and there occurs a range in which noise reduction is not effected. The write operation brings about a rewrite to new data on the way when, for example, the electronic enlarging function is realized by performing interpolation by means of the interpolation circuit 112 which uses the first read area signal, and it suffices that the noise reduction is effected in the range of the interpolation circuit input signal and as shown in FIGS. 5 and 6, the signal in the range of the interpolation circuit input signal is totally included in the range in which the recursive type noise reduction is effective.

By repeating the above operation, the video input signal is written to the field memory 102 and at the same time, the area designated by the read head relative address and read end relative address generated by the electronic enlarging control circuit 111 is read out of the first read port of the field memory 102 and enlarged into a signal of one frame by means of the interpolation circuit 112. The signal of the area read out of the first read port is a signal which is removed of noise by the recursive type noise reduction circuit 110 using the signal from the second read port.

As described above, in the video apparatus with image memory function of the present embodiment, the recursive type noise reduction function and the electronic enlarging function (inclusive of the image stabilizing correction using the electronic enlarging function) can be realized with one field memory having three ports.

In the aforementioned embodiment, for simplification of description, the interpolation function effected by the interpolation circuit 112 has been described as being limited to that in the vertical direction but in the case where the interpolation function is effected simultaneously also in the horizontal direction (for example, in the case of reading only a central portion of an image), the address supplied to the field memory 102 may be divided into a vertical address and a horizontal address, and the control operation as described herein above may be applied to only the vertical address.

While in the aforementioned embodiment no description is given of the detection of the moving amount, the moving amount detection based on the video detection method or the angular velocity detection method may be considered.

Further, in the aforementioned embodiment, no description is given of the interpolation operation based on the electronic enlarging control circuit, interpolation circuit and memory control because the interpolation operation for performing such control as changing the interpolation coefficient for generating an interpolation line in accordance with the zoom magnification and reading the same signal from the memory is known from various literatures.

Figure 8:
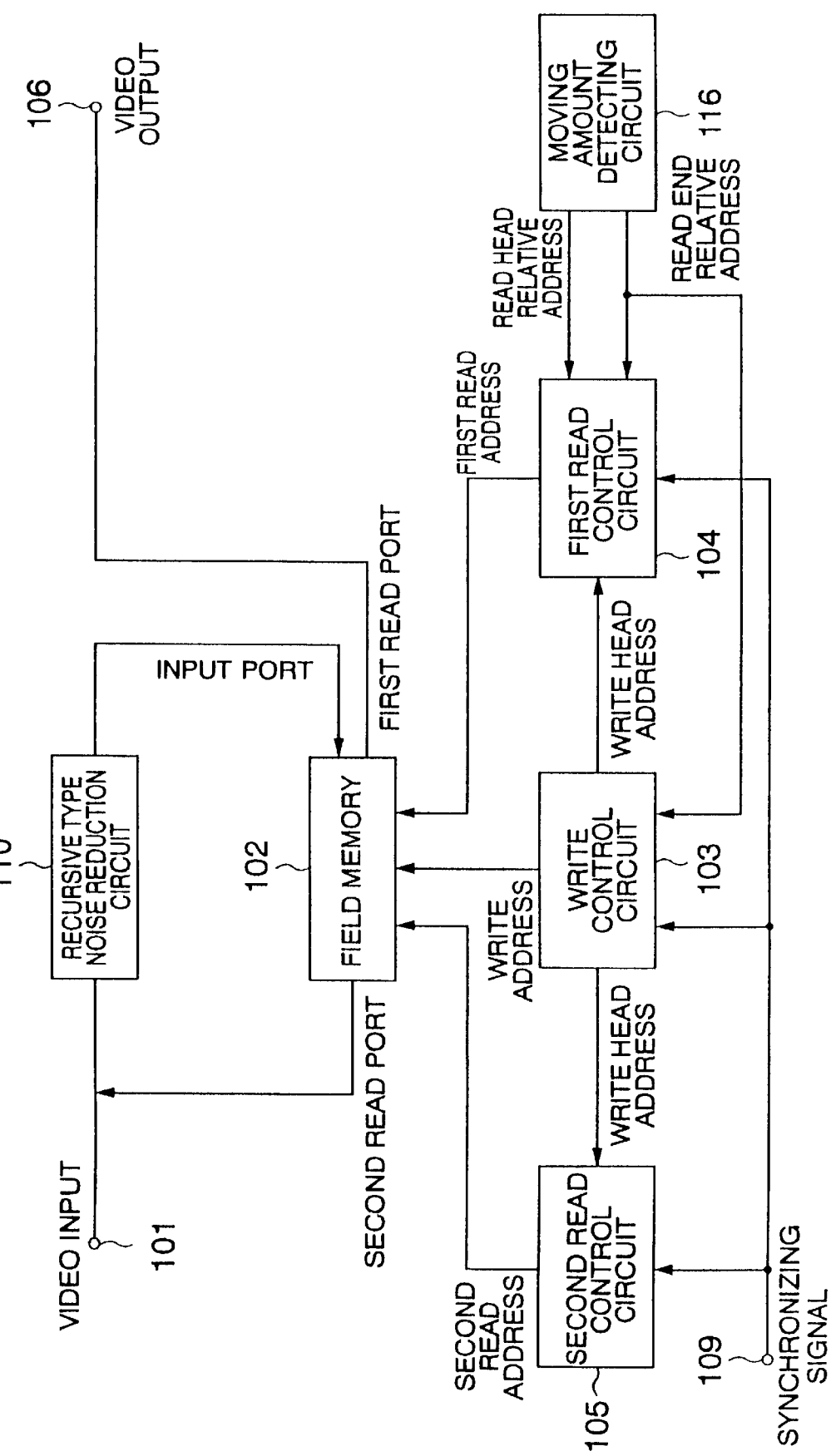
FIG. 8 is a block diagram of a video apparatus with image memory function according to a third embodiment of the present invention.

FIG. 8 is a block diagram showing a video apparatus with image memory function according to a third embodiment of the present invention.

In FIG. 8, components common to FIGS. 1 and 4 are designated by like reference numerals and components different from those of FIGS. 1 and 4 will be described below.

A moving amount detecting circuit 116 detects the moving amount for image stabilization correction and generates a read head relative address and a read end relative address as necessary in accordance with a detected moving amount.

Figure 9:
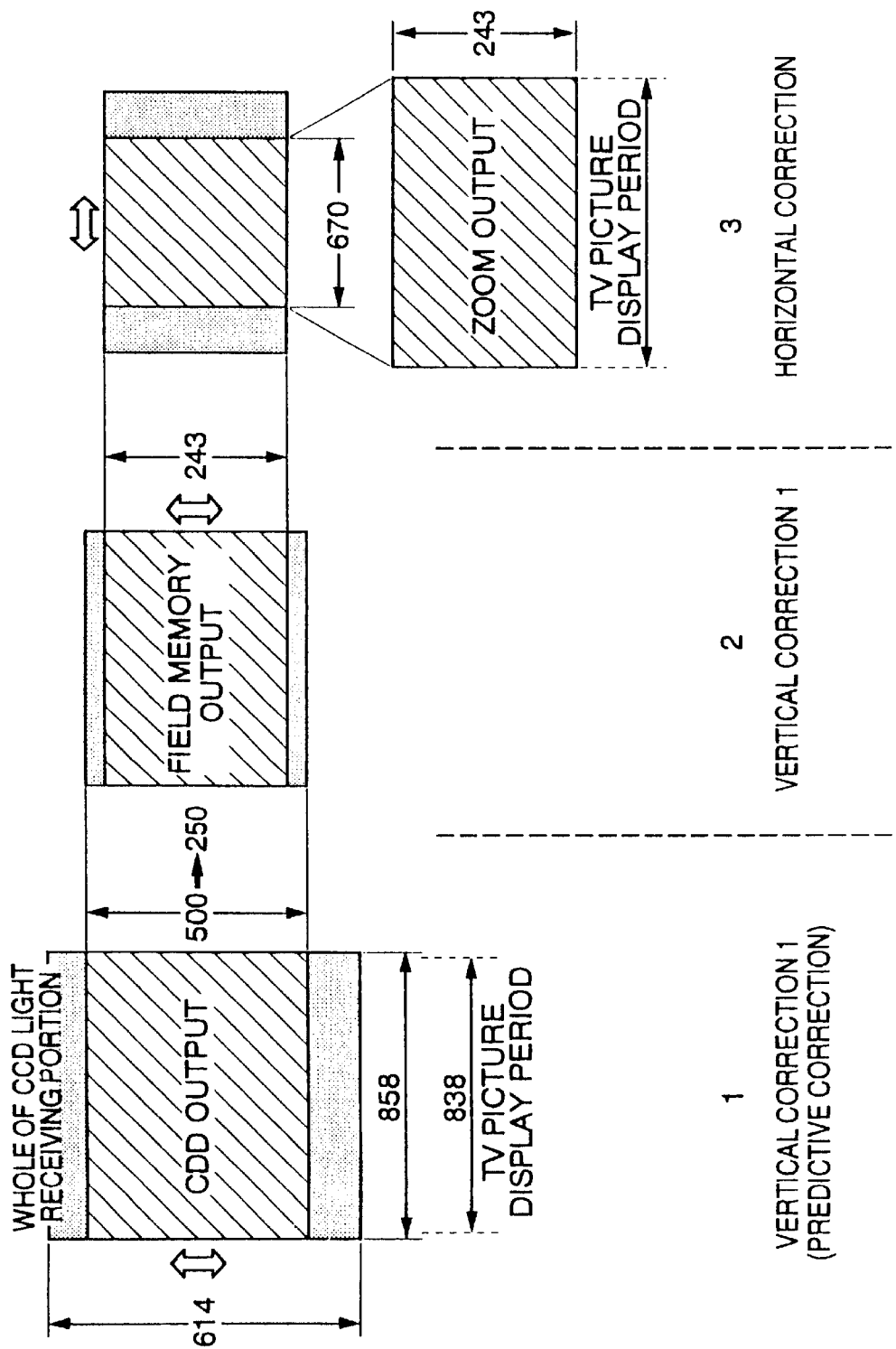
FIG. 9 is a diagram for explaining image stabilizing correction based on an enlargement imaging device scheme in the video apparatus with image memory function of the third embodiment of the present invention.

The image stabilizing correction is a method which uses not the electronic enlarging function but an enlargement imaging device and this method will be described brief with reference to FIG. 9. In this method, as shown in JP-A-7-67021 entitled "Image Movement Correcting Circuit" or in technical report of the Institute of Television Engineers of Japan, Vol. 18, No. 8 entitled "High Resolution Image Stabilizing System by Full Digital Processing", a video signal (here, 838H×250V) is cut out of a CCD (here, 858H×614V) having image stabilizing correcting margin pixels) in accordance with predictive correction (vertical direction) and written to a field memory, then a video signal (here, 838H×243V) is again cut out of the field memory in accordance with correction based on movement detection (vertical direction) and thereafter the video signal is cut out in the horizontal direction. In this manner, a video signal is cut out in the vertical direction by using movement detecting information.

The operation of the video apparatus with image memory function constructed as herein above described will now be described with reference to FIGS. 10 and 11.

Figure 10:
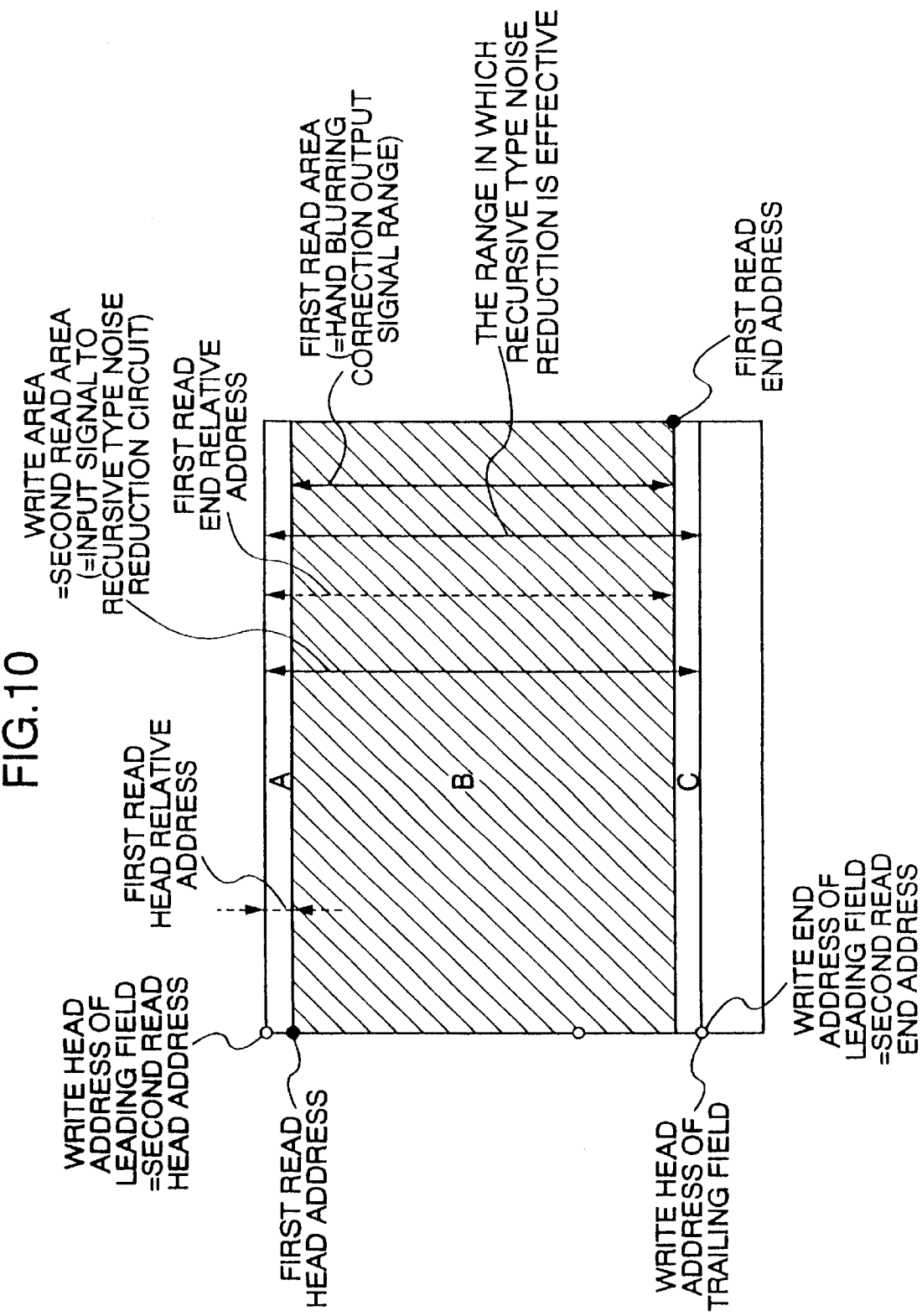
FIG. 10 is a diagram for explaining field memory control in the video apparatus with image memory function of the third embodiment of the present invention.

Like FIGS. 2 and 5, FIG. 10 is a diagram showing the relation between one field of a video signal written to the field memory 102 and areas to be read from the field memory 102 (first and second read areas). In the figure, a write area which coincides with the second read area is designated by A, B and C and the first read area (hatched portion) is designated by B. A write head address of a leading field equals a second read head address of the present field and the write area coincides with the second read area. On the other hand, a first read head address is at a left-above corner of the first read area and this address is determined by adding the read head relative address supplied from the moving amount detecting circuit 116 to the write head address of the leading field which is obtained from the write control circuit 103. Similarly, a first read end address at a right-below corner of the hatched portion B is determined by adding the read end relative address supplied from the moving amount detecting circuit 116 to the write head address of the leading field. The additive processing is carried out by the first read control circuit 104. The present field is read during a trailing field and a write head address of the trailing field which is written simultaneously with read of the leading field is determined by the write control circuit 103 so as to coincide with the second read end address (see also FIG. 11). If the field memory 102 has a capacity of only one field, then the write head address of the present field will be set to an address within the range between an address next to a read end address and a head address of a scanning line following a scanning line on which read operation ends or within the range added with a margin when the capacity of the field memory 102 has the margin (see also FIG. 11). Thus, the write control circuit 103 generates, from the synchronizing signal and the read end relative address supplied from the moving amount detecting circuit 116 (in this case, a fixed value because the image stabilizing correction output signal area is constant), a write address corresponding to a video input signal and the write address is fed to the field memory 102. A write head address of the present field is applied to the first and second read control circuits 104 and 105. The first read control circuit 104 generates, from the write head address and a read end relative address supplied from the moving amount detecting circuit 116 as well as the synchronizing signal, a first read address corresponding to data of the first read area shown in FIG. 10, the second read control circuit 105 generates a second read address corresponding to data of the second read area, and the first and second read addresses are fed to the field memory 102.

Figure 11:
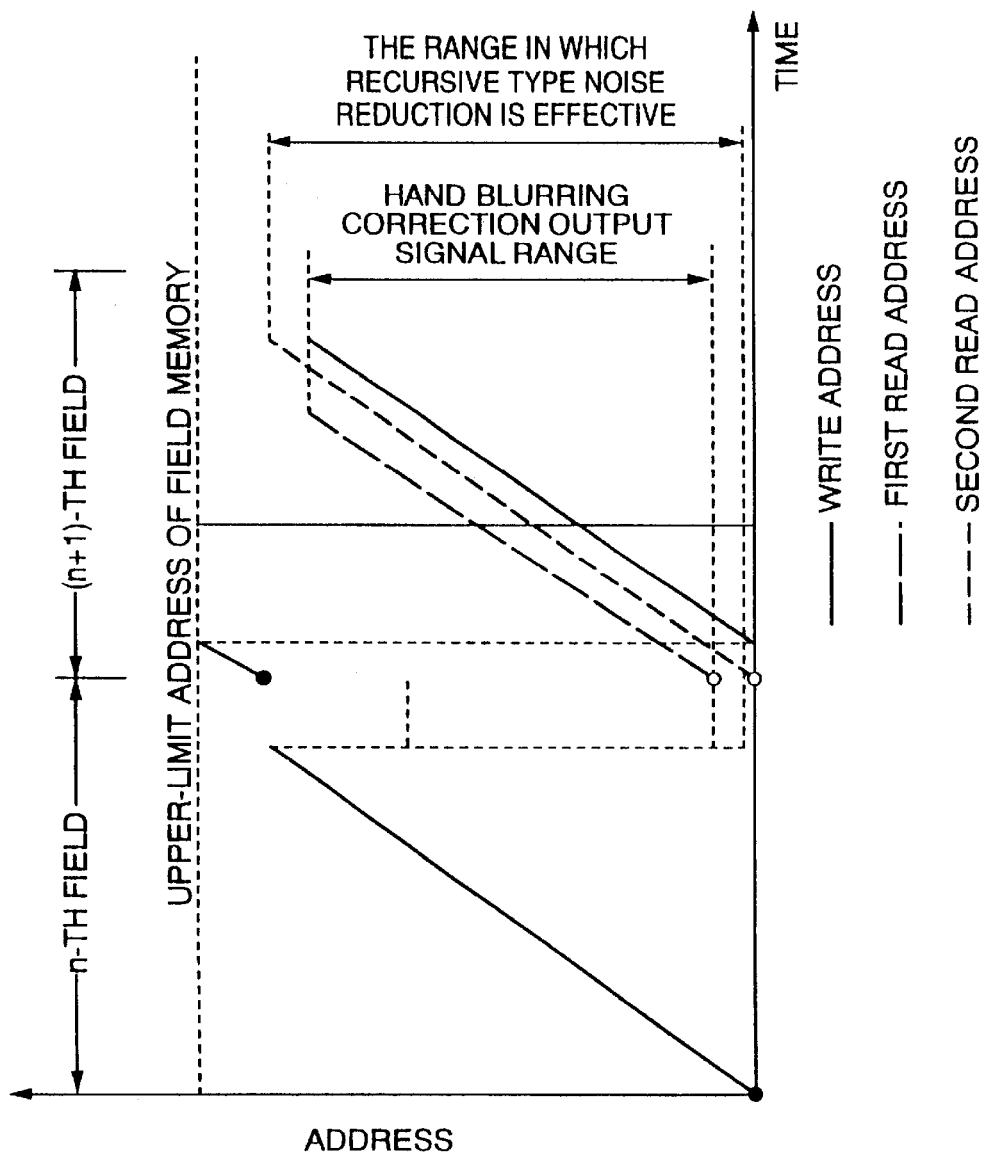
FIG. 11 is a diagram for explaining address control of the field memory in the video apparatus with image memory function in the third embodiment of the present invention.

FIG. 11 is a diagram which shows generation timings of the write and read addresses generated as above, depicting the state in which while a signal written during an n-th field is read during an (n+1)-th field, a new write operation is carried out. The write head address in each field is indicated by a black circle and the read head address is indicated by a white circle. While taking control of, for example, the position of an area within one frame to be cut out by the image stabilizing correcting function, a first read head address during the (n+1)-th field is determined by adding a read head relative address to a write head address of the n-th field as described above and a write head address (black circle) of the (n+1)-th field is determined from a read end address which is determined by adding a read end relative address to the write head address of the n-th field. Since the recursive type noise reduction circuit 110 performs the recursive type noise reduction, the write head address of the n-th field is used as a second read head address during the (n+1)-th field as described above.

The write (read) address is so controlled that when reaching an upper-limit address of the field memory, the write (read) address is continued to a lower-limit address of the field memory to proceed with write (read) operation. In this case, since the vertical position of the first read area differs for each field in accordance with a moving vector detected by the moving amount detecting circuit 116, the head address must be settled before write of this field is started. In other words, calculation for this purpose must be completed before the effective period of this field starts.

At that time, as shown in FIG. 11, a signal of the first read area and a signal of the second read area which are read during the (n+1)-th field in accordance with the first and second read addresses, respectively, are not outrun by the write address.

By repeating the above operation, the video input signal is written to the field memory 102 and at the same time, the area designated by the read head relative address and read end relative address which are generated by the moving amount detecting circuit 116 is read out of the first read port of the field memory 102 and movement such as image stabilization can be corrected. The signal of the area read out of the first read port is a signal which is removed of noise by the recursive type noise reduction circuit 110 using the signal from the second port.

As described above, in the video apparatus with image memory function of the present embodiment, the recursive type noise reduction and the image stabilizing correcting function can be realized with one field memory having three ports.

In the aforementioned embodiment, the signal from the first read port of the field memory has been described as being delivered as it is but the signal from the first read port which undergoes only image stabilizing correction in a unit of line in the vertical direction may be corrected in the order of less than line (fraction) with the aim of further promoting the accuracy of image stabilizing correction. In other words, an interpolation processing circuit may be provided and the signal processed thereby may be delivered.

Further, in the aforementioned embodiment, the image stabilizing correcting function based on the enlargement imaging device scheme using the first read area signal has been described but both of the image stabilizing correcting function based on the enlargement imaging device scheme using the first read area signal and the electronic enlarging function based on the interpolation circuit may be realized.

In the foregoing embodiments, the read end relative address has been described as being inputted to the write control circuit and first read control circuit but these circuits may receive the read head relative address and a first read area range in place of the read end relative address.

What is claimed is:

1. A video apparatus with image memory function comprising:
   a field memory including two independent read ports, a write port, and a capacity of storing an image of one field or more;
   two read control units corresponding to said two independent read ports; and a write control unit corresponding to said write port, wherein:

a first one of said two read control units reads a first area of a signal of an n-th field stored in said field memory, a second one of said two read control units reads a second area that contains said first area and is wider than said first area, a beginning write address of an (n+1)-th field following the n-th field is so determined as to be after an address of an ending read address of said first area, a video signal of the (n+1)-th field is concurrently written to said field memory, starting with said beginning write address, while the signal of said first area is read from said field memory and delivered as another video signal, and information stored in different addresses of the field memory are read concurrently.

2. A video apparatus with image memory function according to claim 1, wherein the signal of said first area is applied with an electronic enlargement processing and the signal of said second area is applied with a noise reduction processing.

3. A video apparatus with image memory function according to claim 1, wherein the signal of said first area is applied with an image stabilizing correction processing and the signal of said second area is applied with a noise reduction processing.

4. A video apparatus with image memory function according to claim 1, wherein said field memory is a memory having independent write and read ports.

5. A video apparatus with image memory function according to claim 1, wherein:

said first read control unit determines a next first area to read of the (n+1)-th field stored in said field memory, said second read control unit determines a next second area, which contains said next first area and is wider than said next first area, to read of the (n+1)-th field stored in said field memory, and both beginning and ending read addresses of the next first and second areas are determined by the respective first and second read control units, during a period of vertical blanking.

6. A video apparatus with image memory function according to claim 1, wherein said write control unit determines a write area, including the beginning write address, of the (n+1)-th field during a vertical blanking period.

7. A video apparatus with image memory function according to claim 1, wherein said write control unit determines the range of a write area of said field memory to be substantially equal to the range needed to store an input video signal of one field duration.

8. A video apparatus with image memory function according to claim 1, wherein said first read control unit determines the range of addresses corresponding to said first area to be within the range of a previous write area of an (n−1)-th field.

9. A video apparatus with image memory function according to claim 1, wherein said write control unit determines the beginning write address of the (n+1)-th field so that it is not within the range of addresses corresponding to said first area.

* * * * *